United States Patent
Zhou et al.

(10) Patent No.: US 9,106,430 B1
(45) Date of Patent: Aug. 11, 2015

(54) ARRANGING CONTENT FOR BROADCAST IN A WIRELESS COMMUNICATION SYSTEM

(75) Inventors: Yu Zhou, Herndon, VA (US); Daniel Vivanco, Reston, VA (US)

(73) Assignee: Sprint Spectrum L.P., Overland Park, KS (US)

(*) Notice: Subject to any disclaimer, the term of this patent is extended or adjusted under 35 U.S.C. 154(b) by 198 days.

(21) Appl. No.: 13/404,371

(22) Filed: Feb. 24, 2012

(51) Int. Cl.
*H04W 4/08* (2009.01)
*H04L 12/18* (2006.01)
*H04N 21/266* (2011.01)
*H04W 4/06* (2009.01)

(52) U.S. Cl.
CPC ........ *H04L 12/185* (2013.01); *H04N 21/26616* (2013.01); *H04W 4/06* (2013.01)

(58) Field of Classification Search
CPC ..... H04L 12/189; H04L 12/18; H04L 12/185; H04L 29/06455; H04L 45/16; H04N 21/6405; H04N 21/26616; H04W 4/08; H04W 4/10; H04W 4/06; H04W 72/005
USPC ............... 370/312, 390, 432; 455/456.1, 518; 709/203, 219, 245; 725/62, 87, 97
See application file for complete search history.

(56) References Cited

U.S. PATENT DOCUMENTS

| 8,001,217 B1* | 8/2011 | Pan et al. ................. 709/219 |
|---|---|---|
| 8,150,993 B2* | 4/2012 | Glasser et al. ............. 709/231 |
| 8,213,857 B2* | 7/2012 | Nichols et al. ............. 455/3.01 |
| 2003/0212814 A1* | 11/2003 | Tzeng et al. ............... 709/235 |
| 2004/0019608 A1* | 1/2004 | Obrador ................... 707/104.1 |
| 2007/0147411 A1* | 6/2007 | Bijwaard et al. ........... 370/432 |
| 2008/0069071 A1* | 3/2008 | Tang ......................... 370/342 |
| 2008/0195664 A1 | 8/2008 | Maharajh et al. |
| 2008/0282190 A1* | 11/2008 | Kagaya ...................... 715/794 |
| 2008/0319833 A1* | 12/2008 | Svendsen .................... 705/10 |
| 2009/0077220 A1* | 3/2009 | Svendsen et al. ........... 709/224 |
| 2009/0222857 A1* | 9/2009 | Nagano ....................... 725/40 |
| 2009/0279468 A1* | 11/2009 | Kenagy ...................... 370/312 |
| 2011/0066746 A1* | 3/2011 | Bennett et al. ............. 709/231 |
| 2011/0082924 A1* | 4/2011 | Gopalakrishnan ........... 709/223 |
| 2013/0042262 A1* | 2/2013 | Riethmueller .............. 725/14 |
| 2013/0067523 A1* | 3/2013 | Kamitakahara et al. ..... 725/96 |

FOREIGN PATENT DOCUMENTS

JP          2005354294 A  * 12/2005  ............. H04L 12/56

OTHER PUBLICATIONS

English machine translation of Tanaka (JP 2005354294).*
Human translation of Tanaka, JP 2004171540 (cited in pre-interview action).*

* cited by examiner

*Primary Examiner* — Benjamin Lamont

(57) ABSTRACT

In systems and methods of arranging content for broadcast in a wireless communication system, a request is received from a plurality of wireless devices, each associated with a user profile, for content associated with content characteristics. A plurality of content for each of the plurality of wireless devices is generated according to the associated user profile. The plurality of content is arranged according to the content characteristics for broadcasting to the plurality of wireless devices in a multicast transmission.

14 Claims, 5 Drawing Sheets

ARRANGING CONTENT FOR BROADCAST IN A WIRELESS COMMUNICATION SYSTEM

TECHNICAL BACKGROUND

Wireless devices are increasingly used for numerous purposes, including to access media from online sources. Online content providers consequently offer a wide selection of media products to consumers, including movies, television programming, and music, in both downloadable and streaming formats. Matching consumers with the most appropriate products is vital for enhancing user satisfaction and loyalty. Content providers face challenges in making media recommendations based on personalized consumer preference and tastes.

In a wireless communication system, an access node can provide streaming media to a wireless device via a unicast transmission. However, the network resources required for providing unicast transmissions increase linearly with the number of wireless devices requesting such unicast transmissions. As greater and greater numbers of wireless devices in a service area request streaming media, the impact on network resources can become pronounced.

OVERVIEW

Systems and methods of arranging content for broadcast in a wireless communication system are provided. A request is received from a plurality of wireless devices, each associated with a user profile, for content associated with content characteristics. A plurality of content for each of the plurality of wireless devices is generated according to the associated user profile. The plurality of content is arranged according to the content characteristics for broadcasting to the plurality of wireless devices in a multicast transmission.

DETAILED DESCRIPTION

In an embodiment, a request is received for content from a plurality of wireless devices. The content is associated with content characteristics, and each wireless device is associated with a user profile. Content is generated for each wireless device according to the associated user profile. The content is then arranged according to the content characteristics for broadcast to the plurality of wireless devices in a multicast transmission. In an embodiment, a similarity criteria is determined for the plurality of content and the plurality of content is arranged according to the determined similarity criteria. Thus, the plurality of content can be scheduled for broadcasting to the plurality of wireless devices according to the determined similarity criteria.

Figure 1:
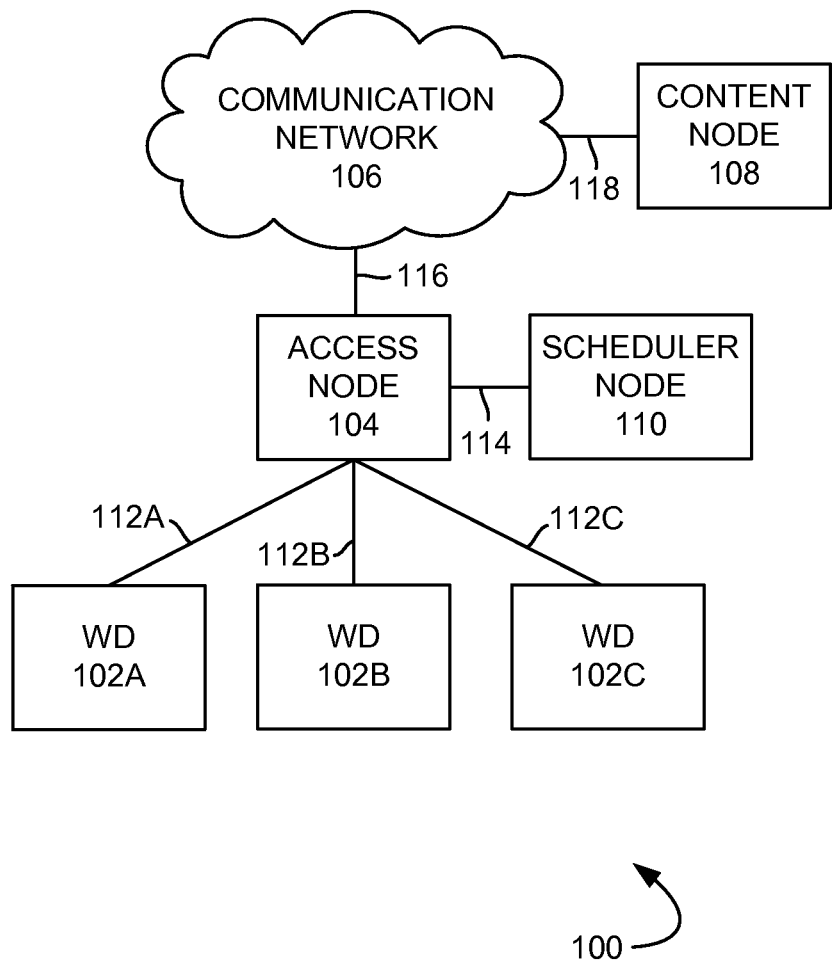
FIG. 1 illustrates an exemplary communication system to arrange content for broadcast.

FIG. 1 illustrates an exemplary communication system 100 to arrange content for broadcast, comprising wireless devices 102A-102C, access node 104, communication network 106, content node 108, and scheduler node 110. Examples of wireless devices 102A-102C include a cell phone, a smart phone, a computing platform such as a laptop, palmtop, or tablet, a personal digital assistant, an internet access device, or other device capable of wireless communication, including combinations thereof.

Access node 104 communicates with wireless devices 102A-102C through communication links 112A, 112B and 112C, respectively. Access node 104 also communicates with communication network 106 through communication link 116, and with scheduler node 110 through communication link 114. Access node 104 is a network node capable of providing communication network access to wireless devices, and can be, for example, a base transceiver station and an eNodeB device.

Communication network 106 is a network or internetwork and is in communication with content node 108 through communication link 118, as well as with access node 104. Communication network 106 may comprise any network that provides communication connectivity for wireless devices 102A-102C to send and receive data. Communication network 106 comprises base stations, wireless communication nodes, telephony switches, internet routers, network gateways, computer systems, communication links, or some other type of communication equipment, including combinations thereof.

Content node 108 is a network element capable of receiving, storing, and providing media data, such as movies, music, television programming, and the like. Scheduler node 110 is a network element capable of arranging content for broadcast, as further described below.

Communication links 112A-112C, 114, 116 and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, code division multiple access (CDMA) 1xRTT, Universal Mobile Telecommunications System (UMTS), High-Speed Packet Access (HSPA), Evolution Data Optimized (EV-DO), EV-DO rev. A, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between the access node 104, scheduler node 110, communication network 106 and content node 108 which are omitted for clarity, including additional processing nodes, routers, gateways, and physical and/or wireless data links for carrying data among the various network elements.

In operation, a request is received, for example at content node 108, for content associated with content characteristics from a plurality of wireless devices, each of which is associated with a user profile. For each of the plurality of wireless devices, a plurality of content can be generated at content node 108 according to the user profile associated with each wireless device. The plurality of content is arranged according to the content characteristics for broadcasting to the plurality of wireless devices in a multicast transmission, for example at scheduler node 110. In an embodiment, similar content requested by a plurality of wireless devices, which would typically be provided to each wireless device via a unicast transmission, is combined into an multicast broadcast, for example, a multimedia broadcast multicast service broadcast.

Figure 2:
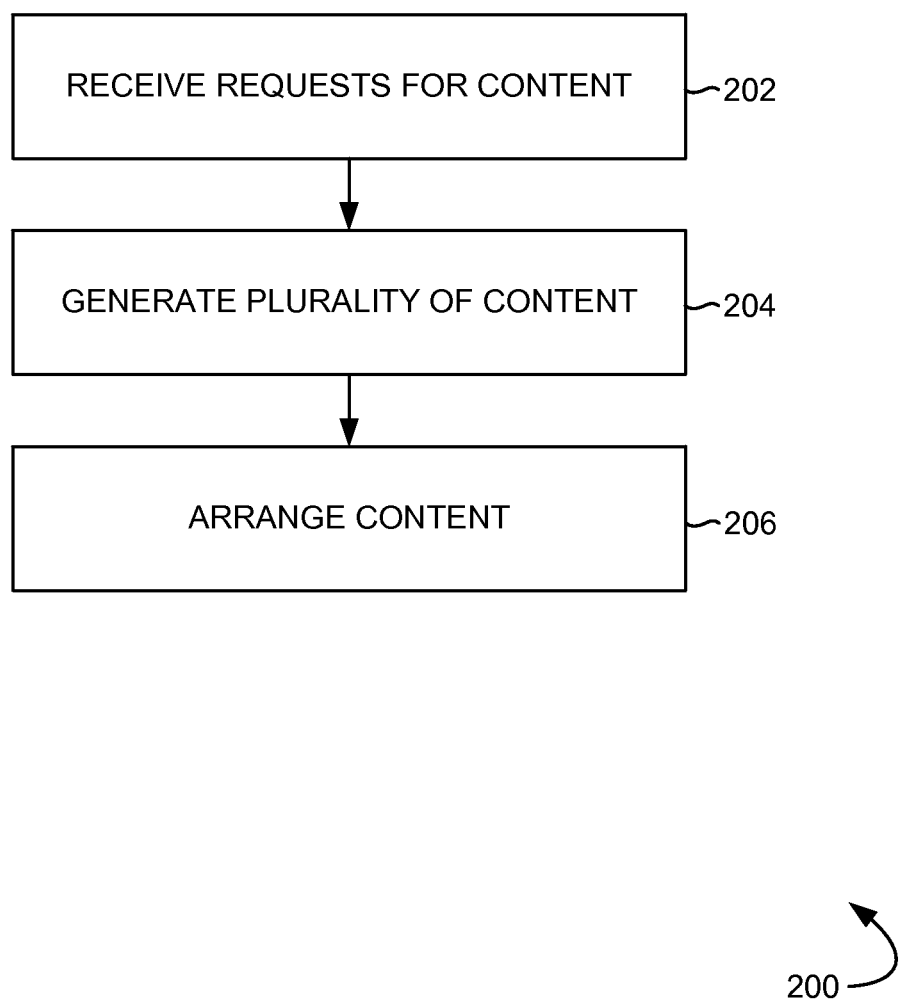
FIG. 2 illustrates an exemplary method of arranging content for broadcast in a wireless communication system.

FIG. 2 illustrates an exemplary method 200 of arranging content for broadcast in a wireless communication system. In operation 202, requests for content are received from wireless devices 102A-102C, each of which are associated with a user profile. A plurality of content is generated for each of the wireless devices based on the respective associated user profile (operation 204). For example, content node 108 can generate the content for each of wireless devices 102A-102C based on a user profile associated with each wireless device. The user profile can be stored at content node 108, or it can be stored at and provided by another network element of communication system 100. The plurality of content is then arranged at according to content characteristics associated with the content for broadcasting to the plurality of wireless devices. For example, scheduler node 110 can arrange the content generated at content node 108 according to content characteristics for broadcasting to wireless devices 102A-102C. Scheduler node 110 can also provide the arranged content to access node 104 for broadcasting to the wireless devices.

Figure 3A:
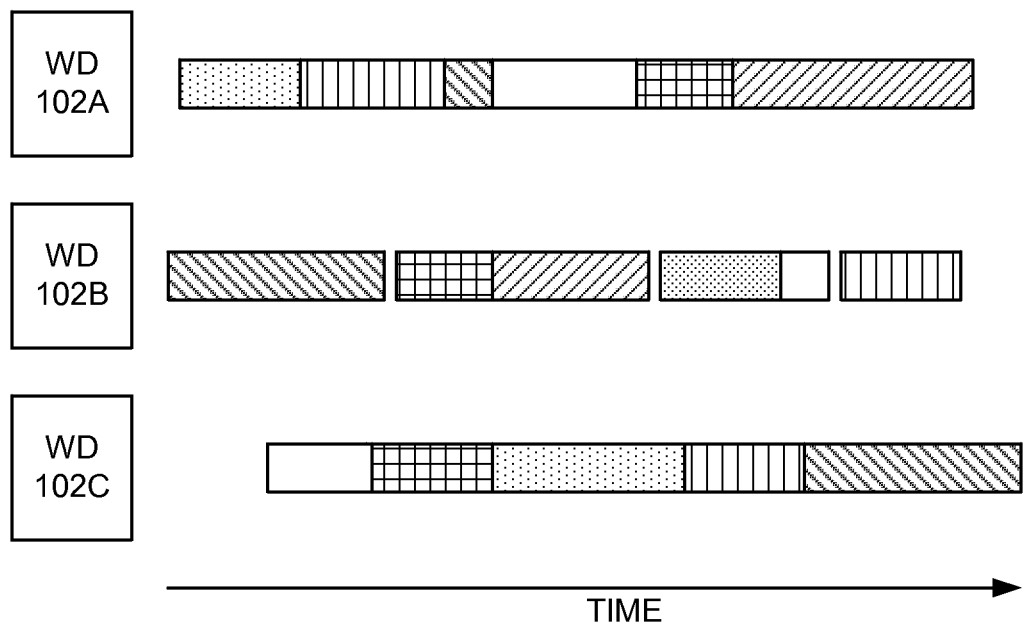
FIGS. 3A and 3B illustrate exemplary content delivery to wireless devices.
Figure 3B:
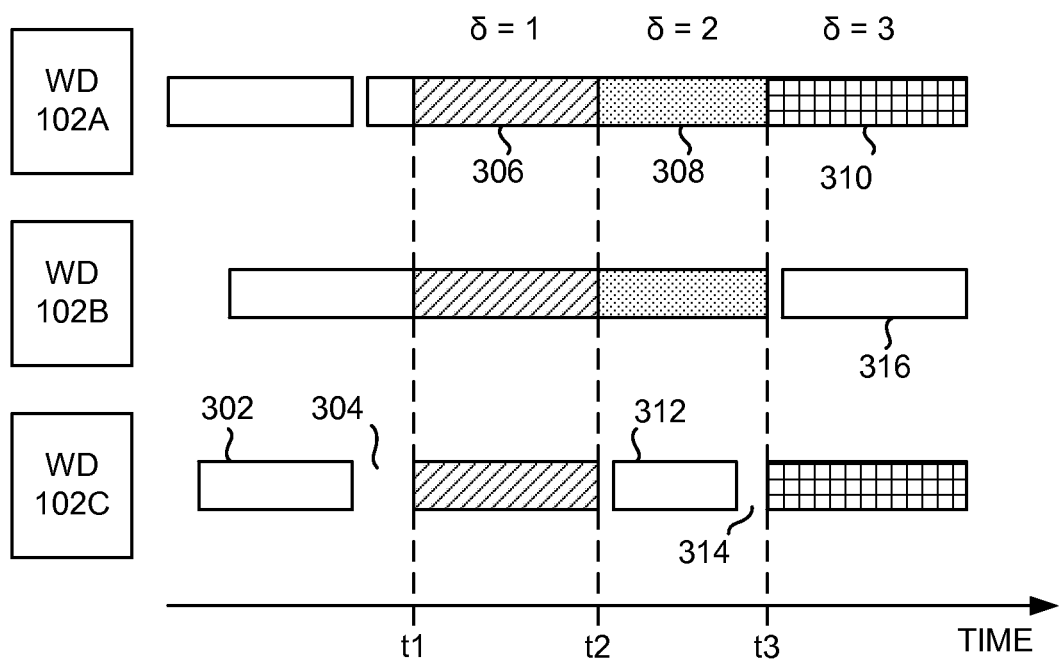

FIGS. 3A and 3B illustrate exemplary content delivery to wireless devices. FIG. 3A illustrates the delivery of various content to wireless devices 102A-102C through separate unicast transmissions. The variations in shading illustrated in FIGS. 3A and 3B indicate different content. At any point in time, different content is provided to each of wireless devices 102A-102C. In addition, each of the various content is provided at different start and end times, and in operation it would be a relatively rare and coincidental circumstance that more than one wireless device would be provided the same content at the same time as another wireless device.

FIG. 3B illustrates the delivery of content which has been arranged for broadcast to wireless devices 102A-102C. Each of wireless device 102A-102C provides a request for content, which content is provided by, for example, content node 108. In an embodiment, content node 108 generates the content for each wireless device, and provides a content list or similar information indicating at least a portion of the content generated for each wireless device to a network node, for example, scheduler node 110. The content is associated with content characteristics, for example, title, track number, album name, genre (so-called TTAG information) and other metadata describing the content, as well as the length of the content. Additional information can be provided as well, such as a content rating such as a Motion Picture Association of America (MPAA) content rating, or information identifying a compression format such as WAV, MP3, MP4, AAC, and the like.

According to the content characteristics, the content for each of the wireless devices 102A-102C is arranged based on a similarity criteria for each of the plurality of content. For example, content characteristics can be compared, and each of the plurality of content can be assigned a similarity criteria according to a number of points of similarity among the content characteristics of the content. When content characteristics are provided with a high level of detail, similarity of various content can be more accurately determined. For example, less detailed content characteristics of music content may indicate that a content's genre is "country" or "rock" or "jazz", whereas more detailed content characteristics may provide more specific characterizations such as "bluegrass", "classic country", "heavy metal", "80s", "swing", and "cool jazz". Similar content characteristics can be applied to other forms of content. In FIG. 3B, the similarity criteria is illustrated as "δ". The greater the number of points of commonality from among the content characteristics, the more similar various content can be considered. Thus, based on the content characteristics, a similarity criteria is determined for the plurality of content, and the content can be arranged according to the determined similarity criteria. In an embodiment, the plurality of content is arranged from most similar to least similar, but it will be appreciated that various arrangements of the content can be achieved according to the similarity criteria.

When the similarity criteria of various content meets a similarity threshold, the content is deemed sufficiently similar, and content can be broadcast to the wireless devices 102A-102C in a multicast transmission. For example, content 306 has been requested by each of wireless devices 102A-102C. According to the associated content characteristics, content 306 has been determined to be similar content, and further, meets a similarity criteria, and so content 306 has been scheduled for broadcast between times t1 and t2 in a multicast broadcast to wireless devices 102A-102C.

When the similarity criteria does not meet a similarity threshold, content can be broadcast to a wireless device in a unicast transmission. For example, content 312 is content which was requested by wireless device 102C, and which did not meet a similarity threshold. Accordingly, between times t2 and t3, while content 308 is broadcast in a multicast transmission to wireless devices 102A and 102B, content 312 is broadcast to wireless device 102C using a unicast transmission.

Unicast transmissions can be used to provide content to only one wireless device, and gaps or silence can be used to synchronize a wireless device for the multicast transmission of content. For example, content 302 is a unicast transmission of content to wireless device 102C. As another example, gap 304 is provided to wireless device 102C by not transmitting any content for a period of time prior to time t1. At time t1, content 306 is broadcast to wireless devices 102A-102C in a multicast transmission. Scheduler node 110 and/or access node 104 can provide indications to the wireless devices 102A-102C of scheduled multicast and unicast transmissions as well as transmission gaps or periods of silence to synchronize the broadcasts of content to each of the plurality of wireless devices.

Figure 4:
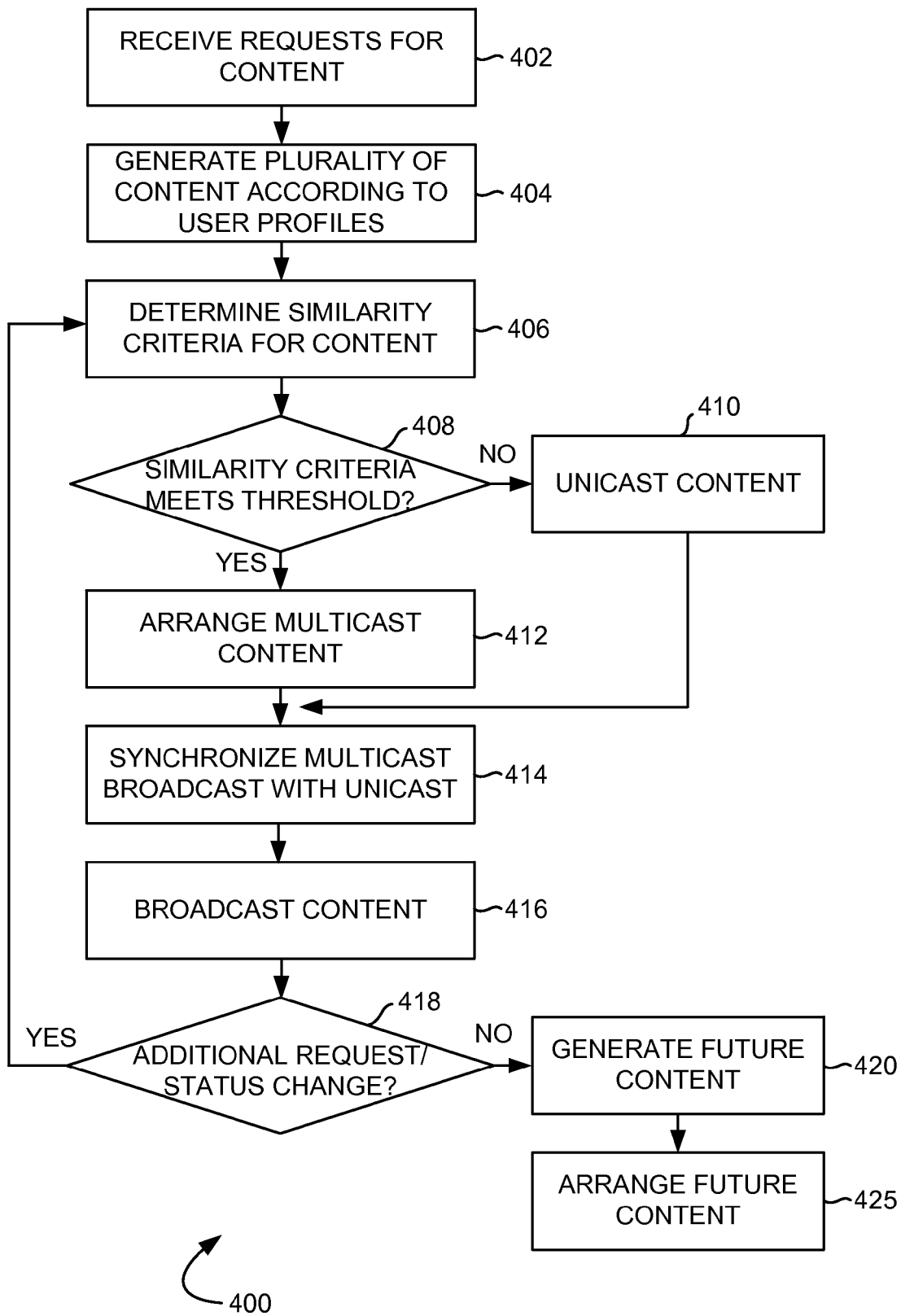
FIG. 4 illustrates another exemplary method of arranging content for broadcast in a wireless communication system.

FIG. 4 illustrates another exemplary method 400 of arranging content for broadcast in a wireless communication system. In operation 402, requests for content are received from wireless devices 102A-102C, each of which are associated with a user profile. A plurality of content is generated for each of the wireless devices based on the respective associated user profile (operation 404). For example, content node 108 can generate the content for each of wireless devices 102A-102C based on a user profile associated with each wireless device.

In operation 406, similarity criteria are determined for each of the plurality of content. The plurality of content is associated with content characteristics. According to the content characteristics, a similarity criteria is determined for the content. For example, content characteristics can be compared, and each of the plurality of content can be assigned a similarity criteria according to the number of points of similarity among the content characteristics of the content. The greater the number of points of commonality from among the content characteristics, the more similar various content can be considered. Thus, based on the content characteristics, a similarity criteria is determined for the plurality of content, and the content can be arranged according to the determined similarity criteria.

When the similarity criteria of various content meets a similarity threshold (operation 408—YES), the content is deemed sufficiently similar, and content can be broadcast the wireless devices 102A-102C in a multicast transmission (operation 412). For example, when content which has been requested by each of wireless devices 102A-102C is determined to be similar content, and further, meets a similarity criteria, the content can be scheduled for broadcast in a multicast broadcast to wireless devices 102A-102C. When the similarity criteria does not meet a similarity threshold (operation 408—NO), content can be broadcast to a wireless device in a unicast transmission (operation 410).

Unicast transmissions can be used to provide content to only one wireless device, and gaps or silence can be used to synchronize the wireless device for the multicast transmission of content (operation 414). Scheduler node 110 can provide the arranged content to access node 104 for broadcasting to the wireless devices (operation 416).

When conditions change, similarity criteria may be redetermined (operation 418—YES). For example, if one of wireless devices 102A-102C makes an additional request for content, or if a new wireless device makes a request for content, then similarity criteria are determined for the additionally requested content.

Content node 108 will also generate future content for wireless devices 102A-102C in accordance with their respective user profiles (operation 420). Similarity criteria can be determined for the future content, and the future content can be provided to a wireless device by a unicast transmission, or arranged for broadcast to the wireless devices in a multicast transmission (operation 425).

The media data provided by exemplary system 100 is not limited to entertainment media. For example, in an embodiment, wireless devices 102A-102C can request map data. In a similar fashion as described above, similarity criteria can be determined for the requested map data, and map data which meets a similarity threshold can be broadcast to a plurality of wireless devices in multicast transmission. Furthermore, future content can be generated by content node 108. For example, future map data can be predicted and generated based on the location and movement of a wireless device. When a wireless device is determined to be in an first geographic location and moving to a second geographic location, map data for the second geographic location can be determined as future content. When such future content can be predicted for a plurality of wireless devices, the future content can be arranged for broadcast by a multicast transmission to the plurality of wireless devices.

Figure 5:
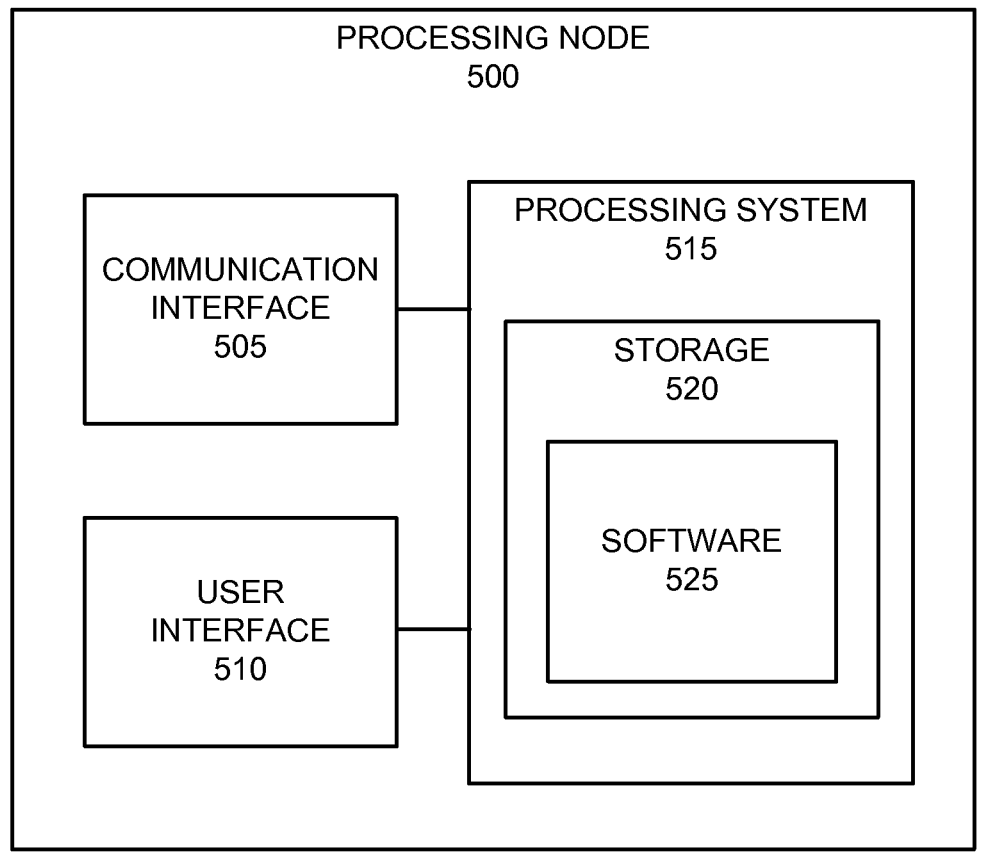
FIG. 5 illustrates an exemplary processing node capable of arranging content for broadcast.

FIG. 5 illustrates an exemplary processing node 500 capable of arranging content for broadcast in a wireless communication system. Processing node 500 comprises communication interface 505, user interface 510, and processing system 515 in communication with communication interface 505 and user interface 510. Processing system 525 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 535 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, etc., which are omitted for clarity. Communication interface 505 permits processing node 500 to communicate with other network elements. User interface 510 permits the configuration and control of the operation of processing node 500.

An example of processing node 500 includes scheduler node 110. Processing node can also be an adjunct or component of a network element, such as an element of access node 104 or content node 108. Processing node 500 can also be another network element in a communication system, including in communication network 106.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of arranging content for broadcast in a wireless communication system, comprising:
   receiving a request for content associated with content characteristics from a plurality of wireless devices each associated with a user profile;
   generating a plurality of content for each of the plurality of wireless devices according to the associated user profile;
   determining a similarity criteria for the plurality of content based on the content characteristics for each of the plurality of content;
   arranging the plurality of content according to the content characteristics for broadcasting to the plurality of wireless devices in a multicast transmission, wherein arranging the content comprises ordering the plurality of content from most similar to least similar according to the determined similarity criteria;
   scheduling a first content and a second content in a first time slot for broadcasting to at least two of the plurality of wireless devices in a multicast transmission when the similarity criteria for the first content and the second content meets a similarity threshold, wherein the multicast scheduling is performed prior to transmitting the first content and the second content;

scheduling a third content in the first time slot for unicasting to one of the plurality of wireless devices in a unicast transmission when the similarity criteria for the third content fails to meet a similarity threshold, wherein the unicast scheduling is performed prior to transmitting the third content;

transmitting the scheduled multicast transmission and the scheduled unicast transmission over the first time slot; and predicting future content having similarity criteria based on the arranged plurality of content, the user profiles, and a location for at least one wireless device that received one of the multicast or unicast transmission.

2. The method of claim 1, wherein arranging further comprises scheduling the plurality of content according to the determined similarity criteria for broadcasting in a multicast transmission.

3. The method of claim 1, further comprising:
synchronizing a broadcast of the plurality of content to each of a plurality of wireless devices by a unicast transmission to at least one of the plurality of wireless devices.

4. The method of claim 1, further comprising:
arranging the future content according to the similarity criteria for broadcasting to the plurality of wireless devices in a multicast transmission; and
transmitting a first future content and a second future content in a multicast transmission when the similarity criteria for the first future content and the second future content meets a similarity threshold.

5. The method of claim 1, further comprising:
redetermining the similarity criteria when a second request for content is received from one of the plurality of wireless devices.

6. The method of claim 1, further comprising:
redetermining the similarity criteria when a status change of one of the plurality of wireless devices is detected.

7. The method of claim 1, further comprising:
scheduling a first future content and a second future content in a second time slot for broadcasting to at least two of the plurality of wireless devices in a multicast transmission when the similarity criteria for the first future content and the second future content meets a similarity threshold;
transmitting the first future content and the second future content in a multicast transmission over the second time slot.

8. A processing node of a wireless communication system, the processing node comprising:
a processor and a communication interface, wherein the processing node is configured to:
receive a request for content associated with content characteristics from a plurality of wireless devices each associated with a user profile;
generate a plurality of content for each of the plurality of wireless devices according to the associated user profile;
determine a similarity criteria for the plurality of content based on the content characteristics for each of the plurality of content; and
arrange the plurality of content according to the content characteristics for broadcasting to the plurality of wireless devices in a multicast transmission, wherein arranging the content comprises ordering the plurality of content from most similar to least similar according to the determined similarity criteria;

schedule a first content and a second content in a first time slot for broadcasting to at least two of the plurality of wireless devices in a multicast transmission when the similarity criteria for the first content and the second content meets a similarity threshold, wherein the broadcast scheduling is performed prior to transmitting the first content and the second content;

schedule a third content in the first time slot for unicasting to one of the plurality of wireless devices in a unicast transmission when the similarity criteria for the third content fails to meet a similarity threshold, wherein the unicast scheduling is performed prior to transmitting the third content; and transmit the scheduled multicast transmission and the scheduled unicast transmission over the first time slot; and predict future content having similarity criteria based on the arranged plurality of content, the user profiles, and a location for at least one wireless device that received one of the multicast or unicast transmission.

9. The processing node of claim 8, further configured to schedule the plurality of content according to the determined similarity criteria for broadcasting in a multicast transmission.

10. The processing node of claim 8, further configured to:
synchronize the multicast transmission of the plurality of content to each of the plurality of wireless devices by a unicast transmission to at least one of the plurality of wireless devices.

11. The processing node of claim 8, further configured to:
arrange the future content according to the similarity criteria for broadcasting to the plurality of wireless devices in a multicast transmission; and
transmit a first future content and a second future content in a multicast transmission when the similarity criteria for the first future content and the second future content meets a similarity threshold.

12. The processing node of claim 8, further configured to:
redetermine the similarity criteria when a second request for content is received from one of the plurality of wireless devices.

13. The processing node of claim 8, further configured to:
redetermine the similarity criteria when a status change of one of the plurality of wireless devices is detected.

14. The processing node of claim 8, further configured to:
schedule a first future content and a second future content in a second time slot for broadcasting to at least two of the plurality of wireless devices in a multicast transmission when the similarity criteria for the first future content and the second future content meets a similarity threshold;
transmit the first future content and the second future content in a multicast transmission over the second time slot.

* * * * *